No. 702,795. Patented June 17, 1902.
I. V. HOLMES.
CENTRIFUGAL SEPARATOR.
(Application filed Nov. 1, 1899.)
(No Model.) 3 Sheets—Sheet 2.
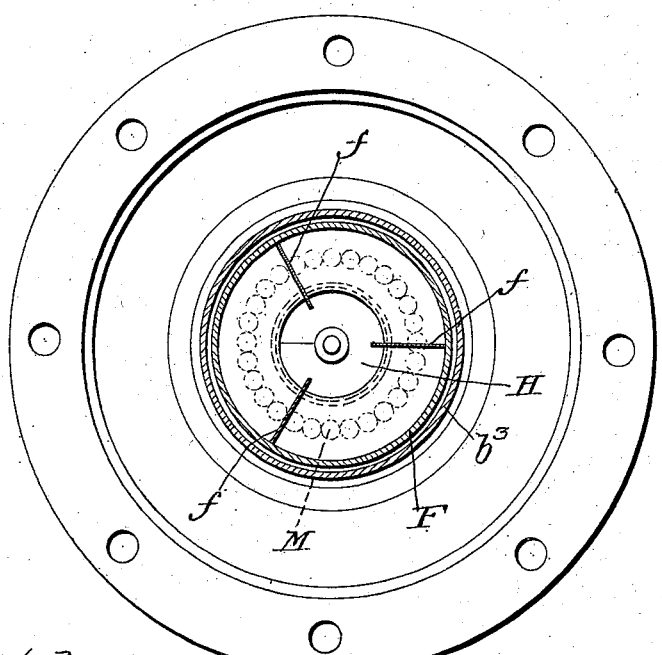
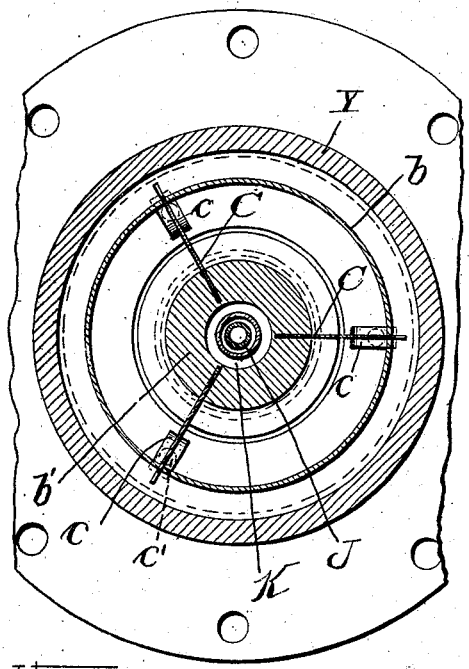
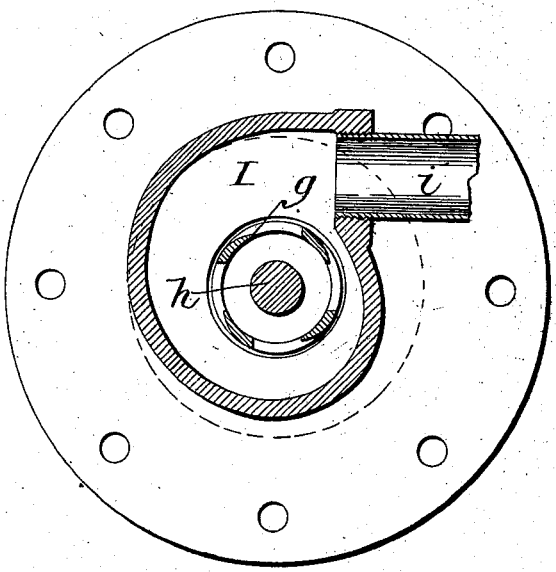
Witnesses—
Ira D. Perry
J B Weir
Inventor—
Isaac V. Holmes.
By Charles C. Wise, Atty

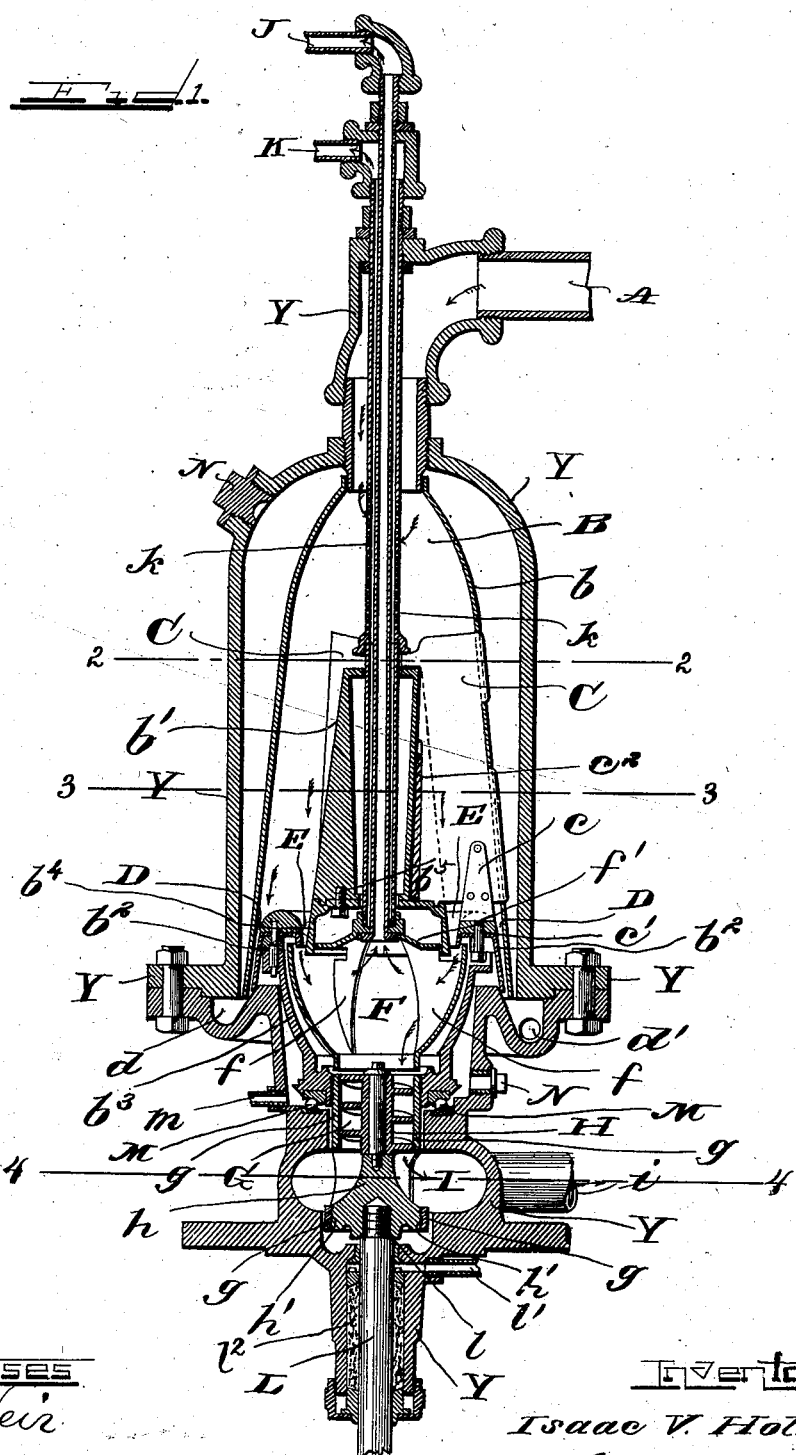

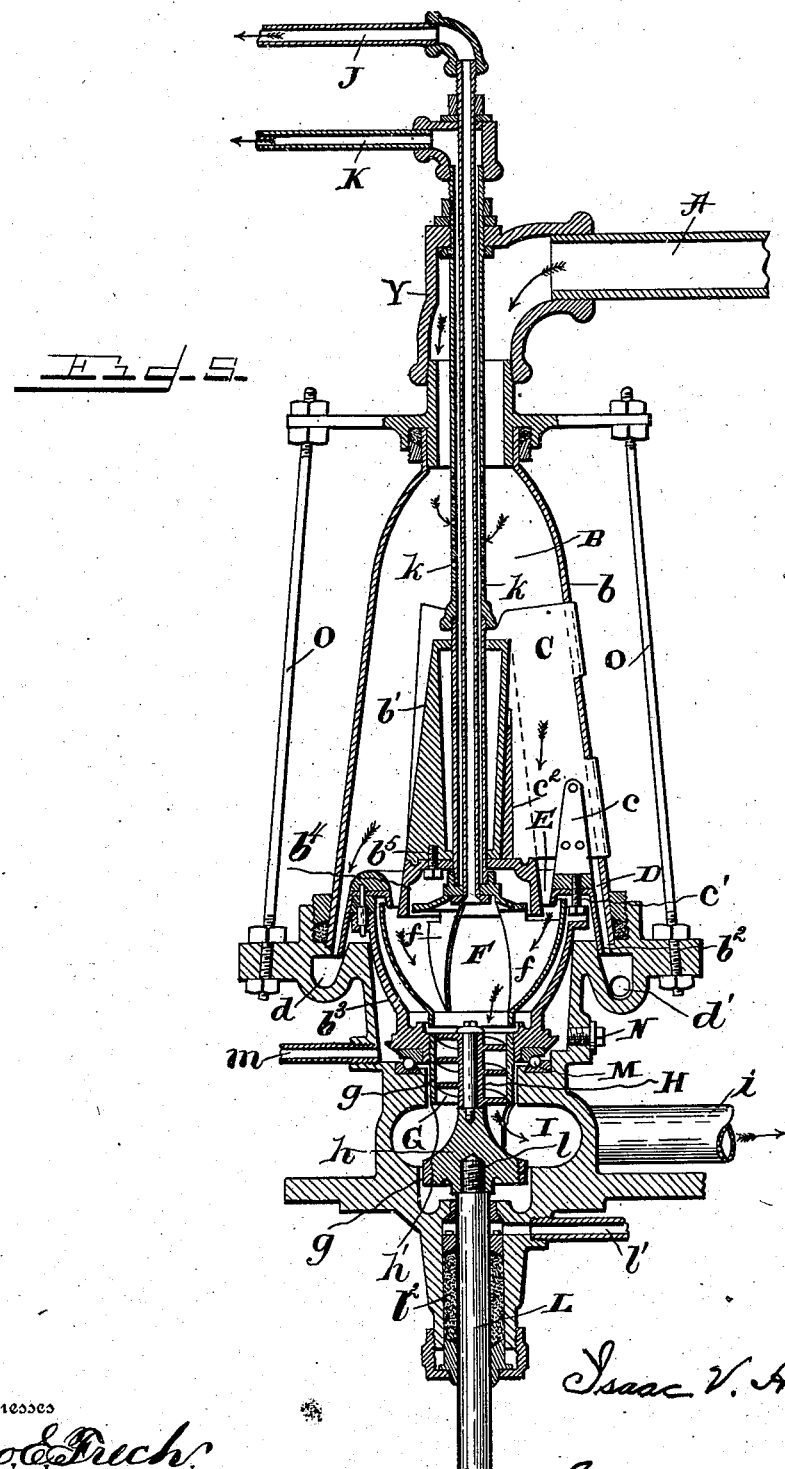

UNITED STATES PATENT OFFICE.

ISAAC V. HOLMES, OF CHICAGO, ILLINOIS.

CENTRIFUGAL SEPARATOR.

SPECIFICATION forming part of Letters Patent No. 702,795, dated June 17, 1902.

Application filed November 1, 1899. Serial No. 735,495. (No model.)

*To all whom it may concern:*

Be it known that I, ISAAC V. HOLMES, a citizen of the United States, residing in and whose post-office address is the city of Chicago, in the county of Cook and State of Illinois, have invented certain new and useful Improvements in Centrifugal Separators, of which the following is a specification.

Referring to the accompanying drawings, wherein like reference-letters indicate the same or corresponding parts, Figure 1 is a vertical axial section of one form of my device. Figs. 2, 3, and 4 are horizontal sections taken, respectively, on lines 2 2, 3 3, and 4 4 of Fig. 1 and viewed in the direction indicated by the arrows at the sides of said last-mentioned figure. Fig. 5 is a sectional view similar to Fig. 1, showing a modification in that the inclosing casing Y is omitted and the upper and lower ends of the revoluble drum B are seated in suitable stuffing-boxes.

My invention relates to devices for the separation of foreign matters from liquids, and it particularly relates to devices for purifying water to be used for purposes of steam generation; and its object is to produce a separator which will in operating effectively eliminate from liquid matters held in suspension and solution therein; and to that end it consists in the features of construction and combination to be hereinafter more particularly described, and pointed out in the claims hereto annexed.

I will herein describe my device and its operation in connection with the use for which it is particularly designed—namely, for purifying water for purposes of steam generation; but it will be understood that I in no manner limit it to said use, as it may be employed to separate foreign matters from liquid either for the purpose of utilizing said liquid thus purified or the eliminated matters. Therefore in describing its particular use the term "water" wherever employed herein shall signify any liquid.

Referring to the drawings, A is an intake-passage communicating at one end with any suitable source of water-supply and at its other end with the drum B; C, partition-walls rigidly secured to the outer wall $b$ and the inner wall or hub $b'$ of the drum and dividing it into separate chambers for a portion of its length; D, an annular outlet-passage formed by the wall $b$ of the drum and the outer wall of the annular base-piece $b^2$, said passage communicating at its upper end with the interior of the drum and at its lower end with the annular passage $d$; $d'$, a discharge-port communicating with the passage $d$ and any suitable receptacle; E, an annular outlet-passage formed by the end $b^4$ of the hub $b'$ of the drum and the inner wall of the annular base-piece $b^2$ and communicating at its upper end with the interior of the drum and at its lower end with the bowl-shaped chamber F; $f$, fixed wings within the chamber F, by means of which and the top $f'$ the chamber F, which communicates with the passage J, is rigidly secured to the walls of the concentric tubes forming passages J K, about the walls of which passages the drum B revolves; G, a spiral passage formed by the wall $g$ and the worm H; I, a receiving-chamber communicating with the spiral passage G and the discharge-passage $i$; $k$, apertures in the walls of the passage K and communicating with the interior of the drum and the passage K, which passage at its upper end may communicate with any suitable receptacle; $b^3$, a bowl-shaped member secured in any suitable manner to and revoluble with the base-piece $b^2$ and the wall $g$; $h$, the base of the worm H, which is provided with any suitable means, as the screw-threads $h'$, by which it may be secured to the wall $g$; L, a driving-shaft connected to the member $h$ in any suitable manner, as by the screw-threads $l$; M, ball or roller bearings; $c$, binding-pieces by means of which and the bolts $c'$ the drum is revolubly secured to the base-piece $b^2$.

It will be seen that the drum B, the base-piece $b^2$, the bowl-shaped member $b^3$, and the wall $g$ are rigidly secured together and revolubly mounted upon the bearings M.

As one of the essential features of my device is that it operates under internal pressure, and since in the construction shown in Fig. 1 there will be some escape around the ends of the drum B, I therefore inclose the upper revoluble parts in a casing Y, adapted to withstand said pressure; but it is obvious that, if desired, that part of the casing which surrounds the drum may be omitted and the drum be fitted at its top and bottom into suitable stuffing-boxes.

I will now describe the operation of the device. Assuming the driving-shaft L and its connected parts to be revolving and the drum filled with heated water, when additional heated water enters the drum B from any suitable source, as through the passage A, it will be centrifugally acted upon, which action will to a certain extent cause the impurities in the water which are of greater specific gravity than the water to move toward the outer wall of the drum and the free air, gases, and impurities which are of less specific gravity to be moved toward the center of the drum—that is, toward the apertures $k$ in the walls of the passage K—through which apertures they will pass and be finally discharged from the passage K in any suitable manner from time to time, as by "blowing out" the purifier through said passage. Now assuming the heavier impurities to lie at or approximate to the periphery of the drum, the lighter impurities to be escaping from the drum through the apertures $k$, and the water lying between said periphery and the hub $b'$ to be pure, then by virtue of the pressure occasioned by the incoming water through the passage A the heavier impurities and a very small proportion of water will be forced downwardly against the outer wall of the drum, from whence they will escape through the passage D into the passage $d$, from which they will be discharged through the port $d'$, while the purified water, being subjected to the same pressure, will be driven from the drum through the passage E into the fixed chamber F, where it will come in contact with the fixed wings $f$ and its rotary motion be at once arrested. From this chamber F the purged liquid will enter the spiral passage G, the revolution of the worm H and the pressure referred to causing it to be forced through the passage I, whence it will be discharged through the passage $i$. As the sudden arresting of the circular motion of the water within the fixed chamber F by the walls $f$ violently disturbs it, causing it to froth, I have provided the passage J, communicating with the chamber F, through which passage said froth and such lighter impurities as were not discharged through the apertures $k$ may be discharged.

The operation of the parts of my device when cold water is employed is the same as the operation when hot water is used so far as all matters held in suspension are concerned; but the matters held in solution remain in solution, the application of heat being necessary to cause foreign matters and gases in solution to become in suspension, the use of hot water with my device or the application of heat to the water being therefore obviously preferable.

It will thus be seen I have provided in a separator means for eliminating foreign matters from hot or cold water, which matters have a greater or less specific gravity than the water and are held in suspension therein, and means whereby when hot water is employed or the water employed be subjected to the influences of heat the gases and free air therein will be eliminated therefrom, thus causing the matters which were held in solution in the water to become in suspension, following which they will be eliminated therefrom in precisely the same manner as they would have been had they originally been in suspension.

Again referring to the drawings, $c^2$ is a key adapted to secure the wing C within a suitable slot (indicated in Fig. 1 in dotted lines) in the hub $b'$; N, clean-cut plugs or caps; M, an oiling port or passage; $l'$, an oiling port or passage through which oil may be communicated to the packing $l^2$; $b^5$, a bolt.

It will be understood that whereas I have described one form of device in which the principle of my invention may be embodied I in no manner limit my invention to that exact form, as it is obvious that the number, size, and form of the parts thereof may be greatly varied without departing from the principle of the invention, and it will be further understood that the expression "lighter impurities" wherever employed herein shall signify free air, gases, vegetable fiber, and other impurities of less specific gravity than the liquid within which they are contained.

Having thus described my invention, what I claim as new, and desire to secure by Letters Patent, is—

1. A centrifugal separator comprising a revoluble drum having at one end an inlet, a centrally-arranged hub, a ring $b^2$ surrounding said hub and separated from said hub and the interior of the drum to form respectively inner and outer outlet-passages, an outlet-chamber in communication with the inner passages, and a surrounding chamber in communication with the outer outlet-passage, substantially as described.

2. A centrifugal separator comprising a revoluble drum having at one end an inlet, a centrally-arranged hub, a ring surrounding said hub at the opposite end of the drum, outlet-passages located respectively at the inner and outer edges of the ring, a chamber below the ring in communication with the inner outlet, a member in said chamber adapted to arrest the motion of the liquid, said chamber having upwardly and downwardly extending outlets, substantially as described.

3. A centrifugal separator comprising a revoluble drum having at one end an inlet, the opposite end having relatively inner and outer outlet-passages, a member provided with an outlet-passage having a forcing-worm in communication with said inner outlet-passage, substantially as described.

4. A centrifugal separator comprising a revoluble drum having at one end an inlet-passage, the opposite end of the drum having relatively inner and outer outlet-passages, a stationary chamber in communication with the inner outlet, stationary wings in said chamber, and the chamber having oppositely-extending outlet-passages, substantially as described.

5. A centrifugal separator comprising a revoluble drum having at one end an inlet-passage and at its opposite end relatively arranged inner and outer outlet-passages, a centrally-arranged hollow hub, a chamber at one end of the hub in communication with the inner outlet-passage, one end of the hollow hub in communication with said chamber and the opposite end of the hub having a communication extending outside of said drum, substantially as described.

6. In combination, a revoluble drum having a hub, concentric pipes extending through the hub, a chamber below the hub in communication with the lower end of the inner pipe, the outer pipe having passages at the upper end of the drum and in communication therewith, the upper ends of the pipes extending outside of the drum, substantially as described.

7. In combination, a revoluble drum having a central hub, the outlet end of the drum having outlet-passages located respectively adjacent the hub and the inner side of the wall of the drum, a shell located below the hub and having open ends, the upper end of the shell in communication with the inner outlet-passage, and a casing surrounding the shell and communicating with the outer outlet-passage, substantially as described.

8. In combination, a revoluble drum, a bowl-shaped extension for the lower end of the drum, an annular bottom supported by the said bowl-shaped extension, the said bottom having peripheral outlet-passages, substantially as described.

9. In combination, a revoluble drum having at its lower end a bowl-shaped extension, the exit end of the drum connected with said extension, the extension constituting a chamber with open upper and lower ends, the exit end of the drum having concentric annular outlet-passages, the inner outlet-passage in communication with the upper end of said chamber, and a worm connected with said extension and located in the lower open end thereof.

10. In combination, a revoluble drum, a centrally-arranged rotatable hub, laterally-extending partitions connecting the said hub and drum, a casing surrounding the said drum the upper end of the drum having a drum inlet-opening, the said casing provided with an inwardly-extending projection engaging the wall of the drum inlet-opening, a ring-like bottom for the said drum having its outer periphery out of contact with the inner side of the said drum, and its inner periphery out of contact with the said hub, constituting concentric annular outlet-passages, a bowl-shaped extension at the lower end of the drum and connected therewith through the medium of the said bottom, a bottom for the said opening having an annular passage surrounding the said bowl-shaped extension of the drum and in communication with the outer annular outlet-passage substantially as described.

11. In combination, a revoluble drum having a central hub with a central non-rotary outlet-pipe extending through the said hub and ending at a point below the same, a chamber located below the hub and in communication with the said pipe, and wings located in said chamber and connected with the said non-rotary pipe, substantially as described.

12. In combination, a hub, a concentrically-arranged drum having an exit end, laterally-extending partitions connecting the hub and the drum and serving to support the latter, the exit end of the drum disconnected with the wall thereof, said exit end having respectively inner and outer passages, the drum having an extension provided with a supporting-bearing, the said extension being out of contact with the wall of the said drum, substantially as described.

ISAAC V. HOLMES.

Witnesses:
CHARLES S. HILL,
M. A. KENNEDY.